July 9, 1946. J. C. NEEDHAM 2,403,874
ELECTRICAL FOLLOW-UP DEVICE
Filed July 10, 1941 3 Sheets-Sheet 1
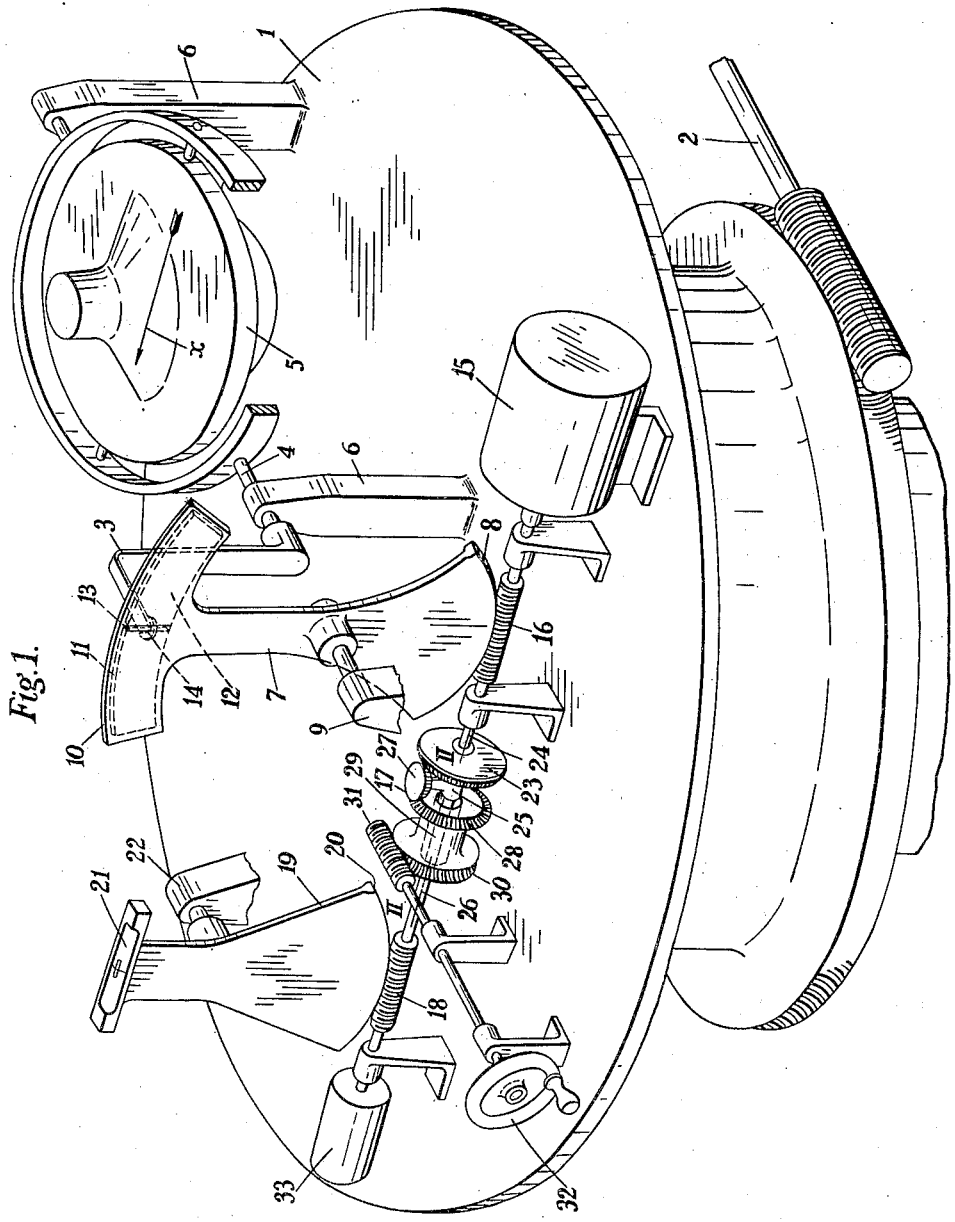
INVENTOR
John Cuthbert Needham
BY
Cameron, Kerkam & Sutton
ATTORNEYS

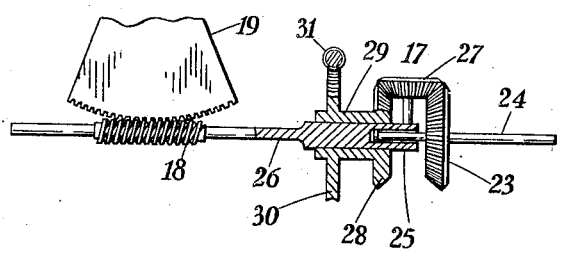
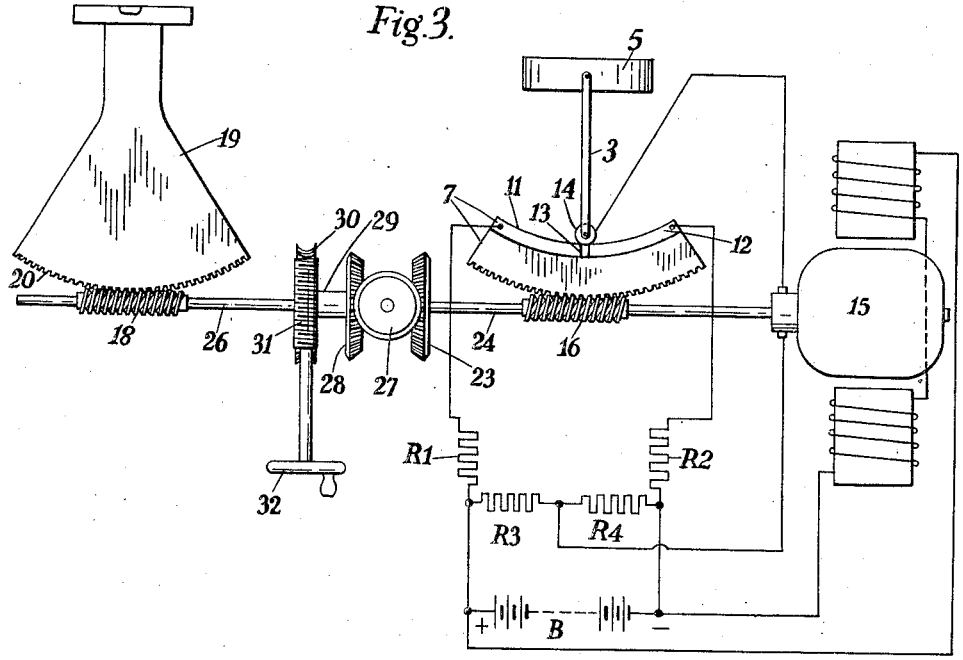

July 9, 1946.

J. C. NEEDHAM 2,403,874

ELECTRICAL FOLLOW-UP DEVICE

Filed July 10, 1941

INVENTOR
John Cuthbert Needham
BY
Cameron, Kerkam & Sutton
ATTORNEYS

UNITED STATES PATENT OFFICE 2,403,874

ELECTRICAL FOLLOW-UP DEVICE

John Cuthbert Needham, Chiswick, London W. 4, England, assignor to Evershed & Vignoles Limited, Chiswick, London, England, a company of Great Britain Application July 10, 1941, Serial No. 401,868
In Great Britain February 27, 1936

5 Claims. (Cl. 33—204)

1

This invention relates to so-called "follow-up" devices which consist of electrical apparatus by means of which movements of a controlled appliance are caused to follow any movements of an element under control of a controlling device. Such "follow-up" devices are employed, for example, as repeaters in gyro compasses or for maintaining some appliance pointing in a constant direction in space. In this latter case, the controlling device may sometimes be a pendulum mounted so as not to be subjected to the rolling or pitching motions of a ship. One important practical application of such "follow-up" mechanisms is the use of such a device to provide a fixed datum with respect to which angles can be accurately defined aboard-ship. Thus, it is essential to provide a constant datum level for the laying of guns carried by a ship which is subjected to pitching and rolling movements.

A gyroscope working in conjunction with an electrical circuit arrangement and follow-up device has been employed for the purpose of obtaining a fixed datum level, with respect to which the elevation of a ship's guns can be determined accurately in spite of the rolling or pitching of the ship. However, it has been found that when a ship fitted with such a system turns from its course, particularly when it makes a comparatively rapid change, a gyroscope so used is liable to precess and, as as a result of the change in direction of its axis, corresponding errors are introduced in the datum level and consequently in the direction of the gun or other controlled appliance.

The principal aim of the present invention is to avoid or to reduce as far as possible, errors due to disturbances of the controlling gyroscope due, for example, to a turning movement effected by the ship.

According to the present invention, the datum member to which the movements of the follow-up element are transmitted, is associated with a level indicator which may be a spirit level, to which any undesired movements of the controlling element due to any disturbance of the controlling device are transmitted, and means are provided enabling any such deviation of the level indicator from the horizontal plane to be corrected under the control of the operator and providing for a corresponding correction to be applied at the same time to the datum member or controlled appliance with the result that a fixed datum line is ensured and the desired direction of the datum member or controlled appliance can be maintained irrespective of any disturbance

2 affecting the normal functioning of the control device. The gyroscope or other controlling device, of course, is able to maintain the datum member or controlled appliance pointing very nearly in a constant direction, but any deviation from this direction is at once made apparent by the level indicator, and in the case of a disturbance, the period of which is not too short, the necessary adjustment to restore the level indicator to its proper position by hand is well within the ability of the operator. It is found in practice that the deviations of the level indicator from the horizontal plane take place quite slowly so that there is no difficulty in adjusting the level so as to restore the horizontal datum and thus to ensure that the controlled appliance is maintained pointing in the desired direction.

The invention will now be more particularly described with reference to the annexed drawings, in which:

Figure 1 is a perspective view showing the preferred form of the apparatus;

Figure 2 is a fragmentary elevation partly in section on the line II—II in Figure 1.

Figure 3 is a circuit diagram; and

Figure 4:
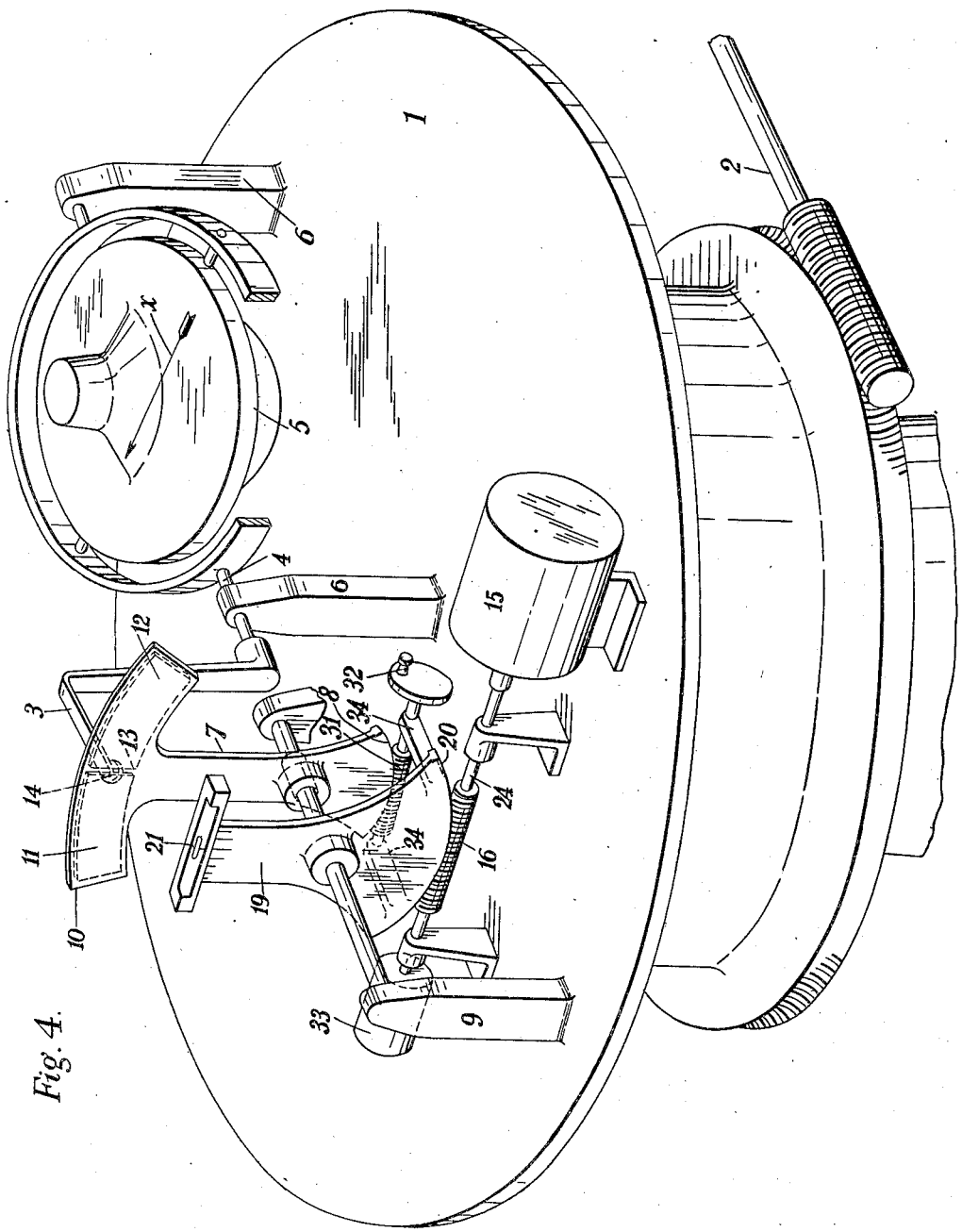
Figure 4 is a perspective view similar to Figure 1 of a modified embodiment.

In both embodiments illustrated in the drawings, it is assumed that the entire system is carried in a ship subject to rolling and pitching motions, and that it is desired to keep any appliance pointing in a fixed direction in a given plane in spite of such movements.

In both of the embodiments shown in Figures 1 and 4, the apparatus is mounted on a turntable 1 which can be turned by means of a worm shaft 2. In Figure 1, an arm 3, which constitutes the controlling element, is rigidly attached to a spindle 4 which is fixed to the controlling device, which in this case is the gyroscope 5, the gimbal ring of which is supported by pillars 6 rigidly fixed to the turntable 1. The latter is turned by the shaft 2 until the arrow $x$ shown in the drawing is pointing along the line of sight. Consequently, as long as the gyroscope 5 is not disturbed or caused to precess, for example, by a rapid change of course, the arm 3 is maintained in a given plane by the gyroscope 5 in spite of pitching or rolling motions of the ship which take place about horizontal axes.

A member 7 having a sector-shaped toothed portion 8 is journalled in a pillar or bracket 9 so as to turn independently about the same axis as the spindle 4. The member 7 constitutes the follow-up member. Its upper edge portion 10 is of arcuate shape and carries two electrically-conducting contact segments 11, 12 on its rear face which are insulated from the member 7 and separated from each other by a narrow vertical gap 13. The segments 11, 12, as shown in Figure 3, are connected in series with resistances $R_1$, $R_2$ constituting two arms of a Wheatstone bridge, the other arms of which are formed by two fixed resistances $R_3$, $R_4$. The electrical circuit is exactly the same as disclosed in British Patent No. 345,042, the electrical source, shown as a battery B, being connected to the outer ends of the resistances $R_3$, $R_4$ and also supplying the field winding of a motor 15. The upper end of the arm 3 is bent at right-angles as seen in Figure 1, and carries an electrically-conductive roller 14 preferably made of a hard tungsten alloy which bridges the gap 13 between the contact segments 11, 12 when the bridge is balanced. The arm 3, as shown in Figure 3, is connected electrically to the upper commutator brush of the motor 15 and the lower commutator brush is connected to the junction between the fixed resistances $R_3$, $R_4$. When the roller 14 is bridging the gap 13, as shown in Figure 3, the bridge is balanced so that no potential difference is applied to the armature of the motor 15 so that the motor remains stationary.

The shaft of the motor 15 carries a worm 16 which is in engagement with the toothed portion 8 of the follow-up member 7. Thus, the member 7 and all other components carried on the turntable 1, except the gyroscope 5 and the arm 3, move with the rolling and pitching motions of the ship, but when as a result of this, the contact segments 11, 12 are displaced relatively to the roller 14, the balance of the Wheatstone bridge is disturbed and the motor 15 rotates in the correct sense so as to restore the condition of balance in which the roller 14 bridges the gap 13. Following a movement in one direction the segments 11, 12 are, of course, displaced in the opposite direction, whereupon the motor 15 is reversed and drives the follow-up member 7 carrying the contact segments 11, 12, so as again to restore equilibrium and maintain the member 7 steady.

The movement of the shaft of the motor 15 are transmitted through planetary gearing 17, best seen in Figure 2, and through a worm 18 to a member 19 which is journalled in a bearing 22 and has a toothed portion 20 engaging with the worm 18. The member 19 carries a spirit level 21, the longitudinal axis of which is parallel to the arrow $x$ and has therefore been turned into the line of sight. One sun wheel 23 of the planetary gearing is fast on the motor shaft 24 and its shaft terminates and is free to turn inside a sleeve 25 which is rigidly connected with the final outgoing shaft 26. The planet pinion 27 is carried on an arm fixed to the sleeve 25. The other sun wheel 28 of the planetary gearing is mounted on an outer sleeve 29 surrounding the sleeve 25, and also carries a worm wheel 30 in engagement with a worm 31 which can be turned by a hand wheel 32.

In operation, if the gyroscope 5 is not disturbed, the spirit level 21 is maintained level but if the gyroscope 5 precesses owing, for example, to the ship carrying out an abrupt turning movement, the resulting error is transmitted to the follow-up device and also to the spirit level 21, the bubble of which slowly wanders and thus indicates any departure from the horizontal plane. The operator watches the spirit level 21, and whenever he sees the bubble wander in either direction, he turns the hand wheel 32 in the appropriate direction so as to turn the sun wheel 28 to restore the spirit level 21 to the horizontal position. This causes the planet wheel 27 to turn the sleeve 25 and consequently the final outgoing shaft 26 the required amount so that the outgoing shaft 26 and the transmitter member 33 fixed to it are corrected for any such errors and are enabled to establish the required datum. This datum is merely the angular position of a line in a vertical plane lying in the direction of sight, that is, parallel to the arrow $x$ and to the longitudinal axis of the spirit level 21. For example, the transmitter drum 33 may send out impulses as it is rotated by the motor 15 which ensures that the said datum line is maintained parallel to the axis of the spirit level 21 so that while the latter is maintained in the horizontal position, the datum is also kept horizontal despite the rolling and pitching of the ship.

The arrangement described above and illustrated in Figures 1 to 3, may be modified in various ways. In practice, of course, it is objectionable to load the gyroscope spindle 4, but it is possible to interpose the member 19, for example, between the follow-up member 7 and the shaft 24 of the motor 15. A modified embodiment arranged in this way is illustrated in Figure 4, in which the planetary gearing 17 is eliminated and the transmitter drum 33 is mounted on an extension of the shaft 24 of the motor 15. In this case, the follow-up member 7 is still mounted on a spindle journalled in the bracket 9, but it is not directly engaged by the worm 16 on the motor shaft 24. The worm 16 on the other hand engages the toothed portion 20 of the member 19 which carries the spirit level 21 and is free to turn on the spindle of the follow-up member 7.

The member 19 in this case is formed with a pair of rearwardly extending lugs or brackets 34 which serve as journals for the spindle of the hand wheel 32, which serves for manual control of the resetting of the spirit level 21. In this case, the worm 31, which is turned by the hand wheel 32, is in engagement with the toothed part 8 of the follow-up member 7.

The operation of the embodiment shown in Figure 4 is as follows. Normally the spirit level 21 will be horizontal as long as the gyro 5 is not disturbed and the roller 14 will bridge the gap 13, as shown in the drawings. The circuit arrangement is as in Figure 3 so that the Wheatstone bridge is then balanced. If, however, the gyroscope 5 precesses for any reason, it will move the arm 3 and the roller 14 and temporarily throw the Wheatstone bridge out of balance. As described with reference to Figures 1 and 3, however, the motor 15 will be energised and rotate in the correct sense to cause the member 7 to follow the roller 14 until the bridge is again balanced. In the present embodiment, this is effected by the motor 15 driving the member 19 through the worm gearing 16, 20, and the lugs 34 moving with the member 19 carry the worm 31 with them with the latter acting as a rack to rock the follow-up member 7.

At this point, the operator will observe that the bubble of the spirit level 21 has wandered and he turns the hand-wheel 32 in the correct direction to turn the follow-up member 7 through the worm gearing 31, 8. This results in unbalancing the Wheatstone bridge so that the motor 15 is again started and drives the member 19 through the worm gearing 16, 20, and this is allowed to go on until the spirit level 21 has again taken up the horizontal position with, of course, the Wheatstone bridge balanced. The datum level is thus restored in spite of the disturbance of the gyroscope 5.

I claim:

1. An electrically-controlled follow-up device comprising a controlling element, a follow-up member cooperating with said controlling element, an electric motor in operative connection with said follow-up member, electrical connections between said motor, said controlling element and said follow-up member controlled by relative movement between said controlling element and said follow-up member to cause said motor to drive said follow-up member in accordance with said relative movement, a level indicator, means operable by said motor to move said level indicator in accordance with the motor-driven movements of said follow-up member, and manually-controlled means associated with said level indicator for causing said indicator to be restored to its normal setting after it has experienced any deviation therefrom.

2. An electrically-controlled follow-up device comprising a controlling element, a follow-up member cooperating with said controlling element, an electric motor in operative connection with said follow-up member, electrical connections between said motor, said controlling element and said follow-up member controlled by relative movement between said controlling element and said follow-up member to cause said motor to drive said follow-up member in accordance with said relative movement, a spirit level, means operable by said motor to move said spirit level in accordance with the motor-driven movements of said follow-up member, and means associated with said spirit level and operable manually independently of said motor for causing said level to be restored to the horizontal position after it has experienced any deviation therefrom.

3. An electrically-controlled follow-up device comprising a controlling element, a follow-up member cooperating with said controlling element, an electric motor in operative connection with said follow-up member, electrical connections between said motor, said controlling element and said follow-up member controlled by relative movement between said controlling element and said follow-up member to cause said motor to drive said follow-up member in accordance with said relative movement, a level indicator, means operable by said motor to move said level indicator in accordance with the motor-driven movements of said follow-up member, manually-controlled means associated with said level indicator for causing said indicator to be restored to its normal setting after it has experienced any deviation therefrom, and a datum or controlled member so connected to said level indicator as to follow the movements of the latter.

4. An electrically-controlled follow-up device comprising a controlling element, a follow-up member cooperating with said controlling element, an electric motor in operative connection with said follow-up member, electrical connections between said motor, said controlling element and said follow-up member controlled by relative movement between said controlling element and said follow-up member to cause said motor to drive said follow-up member in accordance with said relative movement, a planetary gearing comprising two sun wheels and a planet wheel, one of said sun wheels being operatively connected with said motor, a spirit level mounted to turn about a horizontal axis and operatively connected with the planet carrier of said planetary gearing, and manual means connected to rotate the second sun wheel of said planetary gearing for restoring said spirit level to the horizontal position independently of said motor when said spirit level has experienced any deviation from the horizontal position.

5. An electrically-controlled follow-up device comprising a controlling element, a follow-up member cooperating with said controlling element and mounted to turn about a horizontal axis, a spirit level mounted to turn about the same horizontal axis as said follow-up member, an electric motor in operative connection with said spirit level, electrical connections between said motor, said controlling element and said follow-up member controlled by relative movement between said controlling element and said follow-up member to cause said motor to drive said spirit level in accordance with said relative movement, journal brackets rigid with said spirit level, a shaft in gearing connection with said follow-up member and journalled in said journal brackets, and manual means for rotating said shaft and thereby turning said follow-up member with respect to said spirit level, and with respect to said controlling element, whereby said motor is energised to turn said spirit level into the horizontal position.

JOHN CUTHBERT NEEDHAM.